United States Patent [19]

Filippini

[11] 4,335,336

[45] Jun. 15, 1982

[54] DEVICE FOR CONTROLLING SPEED

[75] Inventor: Fulvio Filippini, Versailles, France

[73] Assignee: Enertec, Montrouge, France

[21] Appl. No.: 152,005

[22] Filed: May 21, 1980

[30] Foreign Application Priority Data

May 23, 1979 [FR] France ................................. 79 13211

[51] Int. Cl.$^3$ ............................................. H02P 5/16
[52] U.S. Cl. ...................................... 318/6; 318/314;
318/318; 318/341; 242/75.5
[58] Field of Search ................... 318/314, 318, 341, 6,
318/7; 360/70, 73; 242/75.5

[56] References Cited

U.S. PATENT DOCUMENTS

| 3,137,767 | 6/1964 | Axon et al. ............................ 178/6.6 |
| 3,836,756 | 9/1974 | Yammoto et al. ................... 318/608 |
| 3,950,682 | 4/1976 | Dohanich, Jr. ...................... 318/341 |
| 4,025,837 | 5/1977 | Meier et al. ........................... 318/361 |
| 4,242,619 | 12/1980 | Nakamura et al. .................. 318/341 |

FOREIGN PATENT DOCUMENTS

| 1499643 | 3/1970 | Fed. Rep. of Germany . |
| 2002546 | 2/1979 | United Kingdom . |
| 2005869 | 4/1979 | United Kingdom . |

OTHER PUBLICATIONS

Lin et al., "A Microprocessor Speed Control", *IECI '77 Proceedings*, Mar. 21-23, 1977, pp. 144-151.
Burger et al., "A Microprocessor Driven Digital Servo System", *IECI '77 Proceedings*, Mar. 21—23, 1976, pp. 159-163.

*Primary Examiner*—David Smith, Jr.
*Attorney, Agent, or Firm*—Dale Gaudier

[57] ABSTRACT

A function generator (25) receives the signal (svm) representing the speed of rotation of a motor (13) and works out EN=CN+f (vm), f (vm) being a single-valued and monotonic function of the real speed vm of the motor and CN being worked out by computer means (24) so that: CN=EN−f (VM), VM being the nominal value of the speed of rotation of the motor. The latter is fed by a signal which is a function of EN. The reference information f (VM)=IC is worked out from an item of error information which is a function of the deviation between the real speed (vb) and reference speed (vp) of a tape (10) driven by the motor, the rate of variation of IC having a maximum value limited in absolute value.

The device is suitable for subordinating the rate of travel of a tape carrying sound to the frequency of a pilot signal.

13 Claims, 6 Drawing Figures

DEVICE FOR CONTROLLING SPEED

The invention refers to a device for controlling speed, in particular for controlling the movement of an object at a speed equal to a reference value.

One particular field of application of the invention is that of apparatus for driving a tape carrying a sound or video recording or both of them, where the tape must be driven at a speed defined by a pilot signal. The pilot signal may be an external signal of given frequency. When it is a question of synchronizing the travel of two tapes, in particular a sound tape and a video tape, a signal is employed which is representative of the speed of one tape, for example, the video tape for piloting the driving motor of the other tape.

Mechanical control devices are known which employ a driving member having sprockets for the controlled tape which is perforated in a regular manner. This leads, however, to rapid wear of the perforations and to an irregular progress which appears in the case of a sound tape as disturbances known as wow.

In order to eliminate the disadvantages connected with the employment of a sprocket member for driving a tape the idea has come to mind of employing a system having a smooth capstan driven by a controlled electric motor.

However even in this latter case a number of difficulties may present themselves.

In the first place the controls for the speed of rotation of the electric motor which are employed, generally display a static error which is not zero, for example, in consequence of the appearance of an opposing torque on the shaft of the motor. The static error is the difference between the reference or nominal speed and the speed at equilibrium reached after stabilization of the control.

In the second place in the case of the control of a sound tape at a speed corresponding with the frequency of a pilot signal, the systems known are generally of the type having phase locking between the pilot signal and a signal representative of the real speed of the sound tape. The locking must be strict enough to obtain the accuracy and the stability of control desired. It follows that the slight but abrupt variations in frequency of the pilot signal which in general consists of a succession of pulses are reflected in the driving of the sound tape and give birth to an audible wow when their amplitude exceeds a certain threshold.

The invention also has the object in accordance with one of its aspects, of achieving a control of the speed of rotation of an electric motor to have zero static error by means of a device of the type which includes a circuit for feeding the motor with electric current, a pickup which delivers a measuring signal representative of the real speed of rotation of the motor and an operating circuit which receives the measuring signal and delivers an operating signal to the feed circuit in order to control the speed of rotation of the motor to a predetermined nominal value.

This is obtained by a control device in which in accordance with the invention the operating circuit includes: a function generator which receives the measuring signal and works out an operating value EN corresponding with the function $EN = CN + f(vm)$, $f(vm)$ being a function $f$ of the real speed $vm$ of rotation of the motor and CN a prepositioning value; and means of calculating the value CN, connected to the output from the function generator in order to calculate $CN = EN - f(VM)$, VM being the nominal value of the speed of rotation of the motor; the feed circuit to the motor receiving an operating signal representative of EN and the function $f$ being a single-valued and monotonic function.

By a single-valued and monotonic function is understood here a function which adopts different values for different values of speed and which is uniformly increasing or decreasing.

When the control circuit is in equilibrium the value EN which determines the current applied to the motor no longer varies. Then one necessarily has $vm = VM$ since the function $f$ is single-valued. This equality is correct whatever the opposing torque which can appear at the shaft of the motor within the limits, to be sure, of the possibilities which the motor has the overcoming this opposing torque.

In other words regulation of the motor torque is achieved by controlling the speed of the motor.

When the measuring signal of the speed of rotation has a frequency proportional to the real speed of rotation of the electric motor, the function generator may, for example, consist of an adder which receives the preloading value and adds to it a quantity representative of the period of the measuring signal.

The invention has the further object in accordance with another of its aspects, of achieving a subjection to a reference speed of the speed of travel of a tape without reflections of the significant high-frequency variations in the reference speed, by means of a device of the type which includes a pick-up which supplies a measuring signal representing the real instantaneous speed of travel of the tape, a control circuit receiving the measuring signal and a pilot signal and delivering reference information to an operating circuit of a motor member for driving the tape in order to make the latter travel at a reference speed represented by the pilot signal.

This is obtained by a control device in which in accordance with the invention the control circuit includes comparison means which receive the measuring signal and the pilot signal and deliver error information representative of the deviation between the real and reference speeds of the tape and corrector means which modify the reference information as a function of the error information, the rate of variation of the reference information having a maximum value limited in absolute value.

By "rate of variation of the reference information" IC is understood here the values (positive or negative) of $(\Delta IC/\Delta t)$, $\Delta IC$ representing the variation in IC during the interval of time $\Delta t$.

In other words when the correction of IC takes place continuously in case of need this correction is achieved so that the differential of IC with respect to time is limited in absolute value.

This means that the speed of variation of IC is a function of the amplitude of the error information as long as the latter does not exceed in absolute value a certain threshold, in which case the speed of variation of IC remains in absolute value at the ceiling of a maximum value.

When the correction of IC takes place in case of need at regular intervals of time by positive or negative increments the maximum absolute value of the increments is limited.

This correction may then in case of need be carried out in two ways. One may modify IC by a positive or negative amount of fixed predetermined absolute value corresponding with the maximum limit of variation of IC as a function simply of the sign of the error information.

In accordance with another embodiment, IC is modified each time there is need, by a positive or negative amount the absolute value of which depends upon the amplitude ot the error information as long as the latter does not exceed in absolute value a certain threshold, in which case this amount remains in absolute value at the ceiling of its maximum limit.

The limitation of the variation of the reference information with time enables large and abrupt variations in reference speed not to be reflected onto the tape, recovery being made progressively. Hence a control of average speed is achieved with uncoupling at high frequencies of variations of the reference speed.

It will further be observed that one does not achieve a phase-locking control between the pilot signal and that supplied by the pick-up of the speed of travel of the controlled tape. That is, the error information is not a function of a difference in position, but a difference in speed.

When the tape the speed of travel of which is being controlled carries a sound recording the limit of the variation in absolute value of the reference information is chosen in order to correspond with a predetermined limit in absolute value of the rates of variation of the speed of travel of the tape. This limit to the speed of variation of the speed of travel of the tape is determined in order not to cause audible wow. It is chosen preferably to be equal to about 1% of the reference speed.

The invention will be better understood from reading the description of a particular embodiment, the description being given below by way of indication but non-restrictively by reference to the attached drawings in which.

Figure 1:
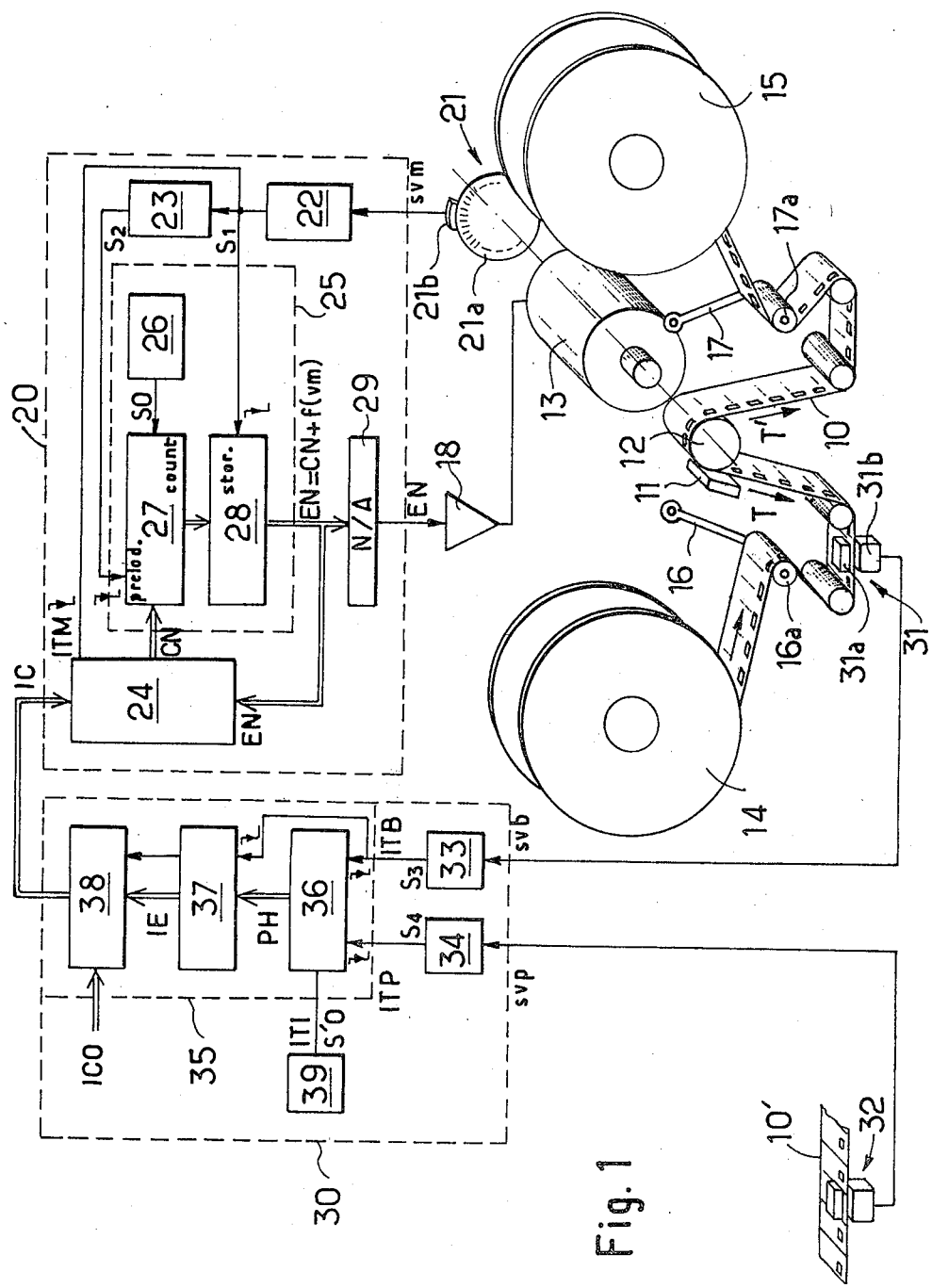
FIG. 1 is an overall diagrammatic view of an embodiment of a speed control in accordance with the invention.

In FIG. 1 the reference 10 designates a perforated magnetic tape carrying a sound recording and driven by passing over a smooth capstan 12 moved by a d.c. electric motor 13.

The tape 10 comes from a delivery spool 14 and is respooled on a receiver spool 15. Between each of the spools 14 and 15 and the capstan 12 the tape passes over pulleys mounted at the ends of tension arms 16 and 17. The arms 16 and 17 are subjected to a restoring force in order to stretch the tape along its path between the pulleys 16a and 17a carried by these arms.

The spools 14 and 15 are driven by means of controlled electric motors (not shown). The control of these motors is achieved by well known analogue circuits which do not come within the scope of the present invention.

In the present case this control is preferably achieved so as to keep the arms in substantially fixed positions for which the tensions T and T' exerted on the tape on opposite sides of the capstan induce upon the latter an inertia torque which is substantially zero. As may be seen in FIG. 1 this is obtained because the paths of the tape 10 on each side of the capstan 12 are orientated symmetrically with respect to the diametral plane containing the axis of the capstan and the line of contact of the tape against it. Hence in starting up the motor 13 has normally only a low inertia torque to overcome, which enables the tape 10 to be brought very rapidly to the desired speed. It will further be observed that the tape is driven simply by adhesion against the smooth capstan, to the exclusion of any pressure roller or sprockets which could deteriorate it and increase the inertia of the system.

Over the portion of the path where it is stretched the tape 10 passes in front of a reading head 11 and in front of a pick-up 31 which delivers a signal svb representative of the real speed of travel of the tape.

A second pick-up 21 is located on the shaft of the motor and delivers a signal svm representative of the real speed of rotation vm of the motor 13.

The d.c. motor 13 is fed with direct current by an amplifier 18 which receives an operating signal $V_{EN}$. Hence in practice this signal determines the torque supplied by the motor. For a given speed vm, if the opposing torque varies, the driving torque must vary so as to compensate it.

The control of the motor 13 is achieved by means of a first circuit 20 which receives the signal svm and an item of information IC as reference for the speed of rotation and delivers the operating signal $V_{EN}$, and of a second circuit 30 which receives the signal svb and a pilot signal svp and determines the reference information IC in order that the tape should be driven by the motor 13 at the speed of travel defined by the pilot signal.

Firstly the circuit 20 will be described which achieves a control of the real speed of rotation vm of the motor 13 to have zero static error in order to make it revolve at a nominal speed VM determined by IC.

The signal svm has a frequency fm representative of the speed vm, for example, proportional to vm: fm = kvm (k being a constant). The pick-up 21 consists, for example, of an optical disc 21a integral in rotation with the shaft of the motor 13 and bearing reflecting (or transparent) marks distributed angularly uniformly. These marks reflect (or transmit) the light coming from a source onto a detector 21b having a photosensitive component which produces a pulse at each passing of a mark. Such a disc may have, for example, 1200 marks, which provides a frequency of the output signal svm of 2000 Hz at a nominal speed of travel of the tape corresponding with a rate of 25 pictures per second for a video tape. Such a pick-up is perfectly well known in itself Other types exist.

A monostable flip-flop 22 receives the pulses svm in order to shape them and deliver pulses S1 (FIG. 2) of duration T1 (for example, 1 microsecond) considerably shorter than the period Tm of the pulses svm (Tm = 1/fm).

The circuit 20 includes a computer member 24 and a function generator 25. The computer member 24 delivers in digital form an item of preloading information CN to the function generator 25 which works out in digital form the quantity EN = CN + f (vm). This quantity EN is the operating information which converted into analogue form by a convertor 29 produces the operating signal $V_{EN}$.

The function f (vm) is a single-valued and monotonic function of the speed vm.

In the example illustrated the function generator 25 includes a clock 26, a preloading counter 27 and a store 28. A monostable flip-flop 23 is triggered by the trailing edge of the pulses S1 and delivers pulses S2 (FIG. 2) of duration T2 which too is significantly less than the period Tm.

Each trailing edge of a pulse S2 operates the preloading of the quantity CN into the counter 27 and the counting of the pulses S0 (FIG. 2) provided by the clock 26 at a frequency F0 which is very much higher than fm (for example, 18 MHz) continues from the preloaded value CN.

The counting continues with if necessary one or more returns to zero of the counter when its maximum capacity is exceeded.

Figure 2:
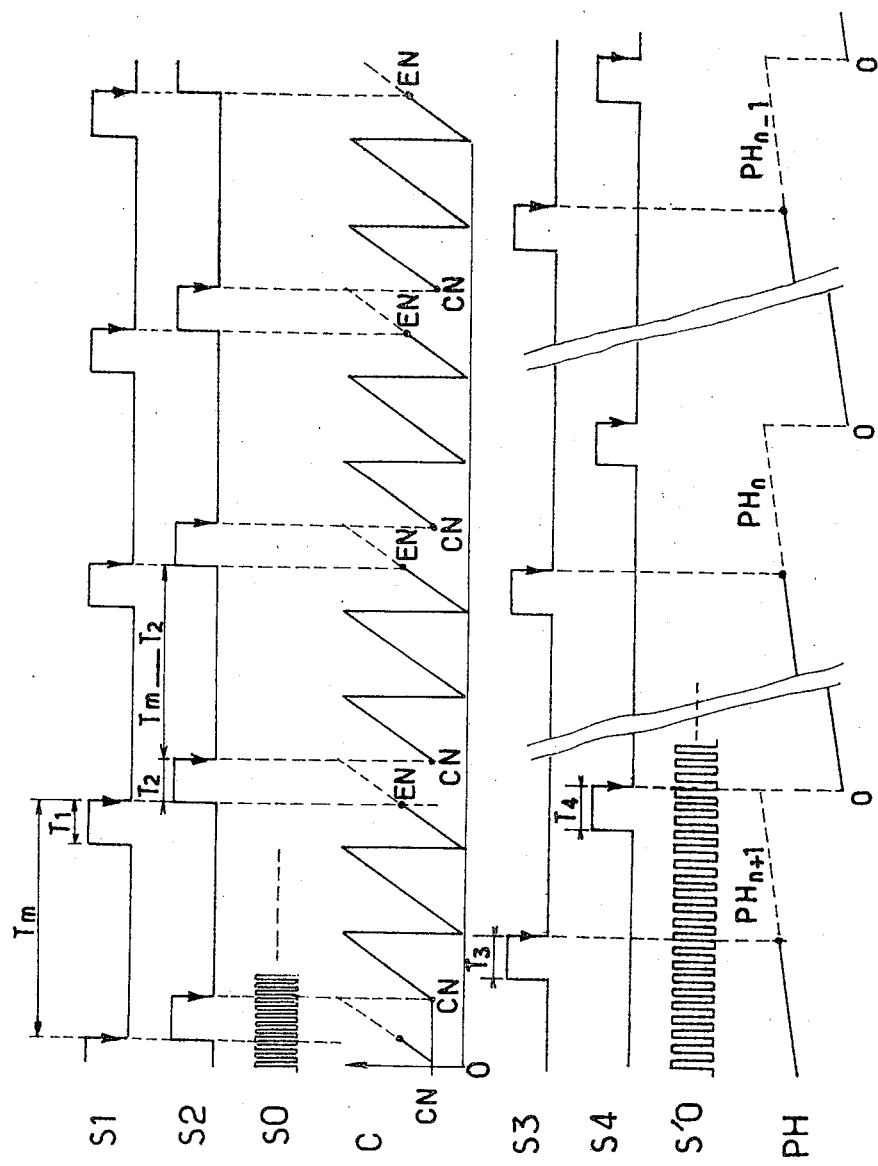
FIG. 2 is a time chart of signals produced at different levels of the device represented in FIG. 1.
Figure 5:
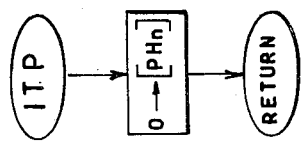
FIGS. 3 to 6 are sequencer charts illustrating different operations carried out during the course of the operation of the device represented in FIG. 1.
Figure 6:
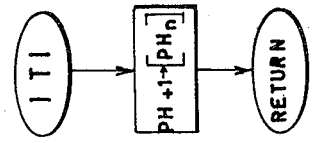
Figure 4:
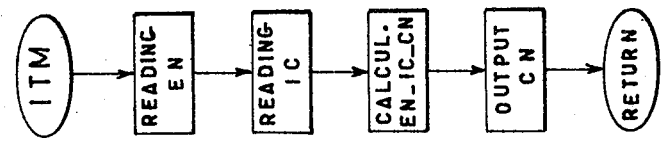

The variation of the contents C of the counter with time may be represented by a slope or possibly by saw teeth (FIG. 2).

Each trailing edge of a pulse S1 causes the storage in the store of the instantaneous contents of the counter, which provides the quantity $EN = CN + (F0/fm) - A$, A being a known constant quantity.

The computer member 24 determines CN in order that the motor may revolve at the speed VM. In order to do this the computer member carries out the operation $CN = EN - IC$ under the control of each pulse S1. Thus each value EN is taken into account by the computer member 24 as soon as it has been stored in order to evaluate the quantity CN before the start of the next counting cycle, being a cycle which starts after a time T2.

The calculation of $CN = EN - IC$ may be achieved without difficulty in wired logic by employing a subtractor circuit and a register for CN.

This calculation may also be carried out by means of a microprocessor as described later.

In the case of the function generator envisaged above one confers upon IC the value $$IC = (F0/FM) - A, \quad (1)$$

FM being the value of the frequency fm when the motor is revolving at the desired speed VM.

The operation of the control is as follows:

If the speed vm becomes less (more) than VM, the frequency fm decreases (increases) and the value EN increases (decreases). The motor then receives more (less) current and its speed increases (decreases). In particular if an opposing torque appears (for example, accidental friction against the capstan), the motor 13 will receive the necessary current for overcoming this torque and a new equilibrium is attained with a different motor torque but with unchanged speed.

It has been seen above that the mounting of the tape on the capstan may be achieved so that the inertia torque on the capstan is practically zero. In the case where the counter 27 has a limited capacity, in particular, if it returns one or more times to zero during the course of each counting cycle it is preferable to choose the control parameters (K, F0, T2 in particular) in order that at the nominal speed VM the value EN corresponds substantially with half or even a little less than half the capacity of the counter 27. Thus an increase in the value EN is authorized in the case where, for example, the torque from the motor must be increased in order to overcome a sudden opposing torque and possibilities of control are offered in a range of speeds which is sufficiently extended on opposite sides of the nominal speed.

The accuracy of the control is tied to the absolute error in the determination of EN. For a control at a speed VM corresponding with a frequency FM the accuracy is given by FM/F0.

The second control circuit 30 will now be described, the object of which is to determine the reference information IC in order that the tape 10 may travel at a reference speed determined by the pilot signal svp.

The signal svb has a frequency fb representative of the real speed of travel vb of the tape 10, for example, a frequency proportional to vb: $fb = k \cdot vb$ (K being a constant). The pick-up 31 consists, for example, of a light source 31a and a photosensitive receiver 31b located on opposite sides of the path of perforations regularly spaced along the tape 10. Other marks might be employed, for example, recordings carried by the tape and detected by appropriate reading means. One may also employ the travel of the tape itself in order to drive a wheel with or without sprockets, the rotation of which provides the signal svb required, or any other pick-up of the travel of the tape.

The pilot signal svp may be a synchronization signal supplied by an external source or a reference signal representing the speed of travel of a tape to which it is desired to subordinate the speed of travel of the tape 10.

In the example illustrated the signal svp is produced by a pick-up 32 similar to the pick-up 31 and delivering a frequency signal fp proportional to the speed vp of travel of a perforated picture-carrying tape 10'. The ratios of proportionality between fb and vb and between fp and vp are equal to K, where the number K may, for example, be equal to 1 if the speeds vb and vp are expressed in pictures/second.

The pulses from the signals svb and svp are shaped by means of monostable flip-flops 33, 34 which deliver pulses S3, S4 (FIG. 2) of durations T3, T4 and of frequencies fb and fp to a circuit 35 which works out an item of error information IE representative of the difference between the speeds sb and vp and which determines the reference value IC as a function of an initial reference value ICO and successive values of the error information.

The information IE is here worked out by measurement of the variation in the time of the phase shift PH between the signals svb and svp and the rates of variation ($\Delta IC/\Delta t$) are determined as a function of the measured value of IE.

In FIG. 1 the circuit 35 is represented as consisting of three functional units: a counter 36, a first digital computer member 37 which receives the contents of the counter 36 and works out the value IE and a second digital computer member 38 which receives the value IE and works out the value IC.

Between one trailing edge of a pulse S4 and the following trailing edge of a pulse S3 the counter 36 counts the pulses S'0 of frequency F'0 supplied by a clock 39. The frequency F'0 is chosen to be distinctly higher than fp, for example, 2000 Hz.

At each trailing edge of a pulse S3, the counter 36 contains a number PH (FIG. 2) which represents the phase shift between svb and svp.

The computer member 37 works out under the control of pulses S3, the quantity $IE = \Delta PHn$ which represents the difference between the nth number (PHn) and the (n−1)th number PH (PHn−1) supplied by the counter 36.

At the end of each calculation of $\Delta PHn$ the computer member 38 carries out the operation $IC = IC + \Delta ICn$, that is to say, it corrects the existing value IC by a quantity $\Delta IC_n$ if the calculated quantity $\Delta PH_n$ is not zero. By way of indication, in the example described, this operation is carried out for each picture, that is to say, at a nominal rate of 25 times per second. The accuracy in absolute value respecting $\Delta PH_n$ is given by the period of the pulses S'0.

The sign of $\Delta IC_n$ depends upon that of $\Delta PH_n$. In the case of the example illustrated these signs are opposite in order that an increase in the phase shift between svb and svp (which expresses an acceleration of the tape 10') is expressed by a reduction in IC and hence an increase in FM and the nominal speed VM (see equation 1).

The absolute value of $\Delta IC_n$ is constant and predetermined at a value $\Delta IC$ max which corresponds substantially with the maximum variation in speed of the tape 10 which is tolerable in order not to generate audible wow. By way of indication, when the signal sp is provided by detection of the perforations in a video tape which is traveling at a rate of 25 pictures per second, one assumes that the maximum variation in speed of the sound tape corresponds with a recovery of one picture every four seconds, or a speed of recovery which at a maximum is equal to about 1% of the reference speed of the video tape.

By way of variant one may choose from a number of discrete values of $|\Delta IC_n|$, or calculate the absolute value $|\Delta IC_n|$, as a function of the amplitude of the error information as long as this amplitude remains in absolute value less than or equal to a threshold value for which the corresponding value of $|\Delta IC_n|$ is $\Delta IC$ max. Beyond this threshold the variation in IC is limited to the ceiling of the value $\Delta IC$ max. and the recovery is effected progressively.

The circuit 35 may be realized in wired logic. The computer members 37 and 38 may therefore consist of algebraic adder circuits associated in particular with registers for PH, IE, IC and $\Delta IC$ max.

In accordance with another embodiment the functions realized by the counter 36, the computer member 37 and the computer member 38 are carried out by means of a microprogrammed processing unit (microprocessor), as well as the function realized by the computer member 24, the representation of these operational elements in FIG. 1 having therefore the object of facilitating understanding of the operation.

The functions called to mind above are carried out as a result of interruptions ITB, ITM, ITP and ITI in the main programme, which are triggered respectively by the pulses S3, S1, S2 and S'0.

Figure 3:
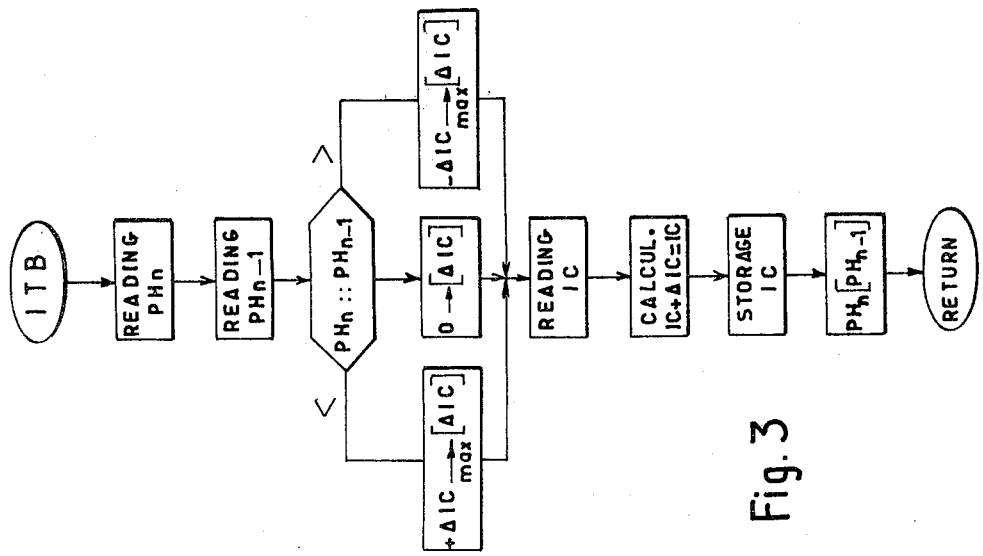

The interruption ITB causes the calculation of IE and the correction of IC by the following operations (FIG. 3):

reading of $PH_n-1$ in a register $[PH_n-1]$
reading of $PH_n$ in a register $[PH_n]$
comparison of $PH_n$ with $PH_n-1$ and writing of $+\Delta IC$ max, 0, or $-\Delta IC$ max into a register $[\Delta IC]$ depending upon whether $\Delta PH_n$ is negative, zero or positive,
reading of IC in a register [IC]
calculation of $IC+\Delta IC$
storage of the result of $IC+\Delta IC$ in [IC]
loading of $PH_n$ into $[PH_n-1]$, and
return.

The interruption ITM causes the calculation of CN by the following operations:

reading of EN in the store 28
reading of IC in the register [IC]
calculation of $EN-IC=CN$
output of the preloading value CN, and
return.

The interruption ITP controls simply the setting to zero of the contents of the register $[PH_n]$ before the return to the main programme.

The interruption ITI controls simply the incrementation by one unit of the contents of the register $[PH_n]$ before the return to the main programme.

It will further be observed that upon starting up the control (time t=0) one loads into the register [IC] an initial value ICO determined as a function of the estimated or assumed value of the reference speed.

By the action of the circuits 20 and 30 any constant phase shift is maintained between the signals svb and svp and not a predetermined phase locking between these signals.

In the case where the tape 10 is a sound tape which is to be synchronized with a video tape 10' the starting of the control is effected after initial relative positioning of the two tapes.

The relative positioning may be effected as known in itself, by means of a differential counter which receives counting information giving the instantaneous position of each tape from a point of origin. This positioning does not come within the scope of the invention.

The control by means of the circuit 30 does not have the object of maintaining the tapes in a strictly predetermined relative position, but of subordinating the speed of the tape 10 to that of the tape 10', the control being effected with decoupling at high-frequencies of variation of the speed of the tape 10'.

Of course various modifications or additions may be applied to the embodiment described above of a speed control in accordance with the invention without thereby departing from the scope of protection defined by the attached claims.

I claim:

1. A device for controlling the speed of rotation of a DC electric motor to a nominal speed VM, comprising:
   (a) means for generating a measuring signal representative of the real speed vm of the motor;
   (b) an operating circuit for receiving the measuring signal and for generating and supplying said motor with a DC drive signal having an operating value EN, comprising:
      (i) means for storing a digital representative of a prepositioning value CN;
      (ii) a function generator responsive to said measuring signal and said prepositioning value CN for calculating said operating value EN as the sum of said prepositioning value CN and of a single-valued and monotonic function f of said real speed vm of the motor; and
      (iii) means, connected to the function generator for continuously calculating and modifying said prepositioning value CN as the difference between said operating value EN and a single-valued and monotonic function f of said nominal value VM; and
   (c) a circuit for receiving said operating value EN from the function generator and for driving the motor with a current directly proportional to said operating value, whereby said real motor speed is continuously maintained at said nominal value VM despite variations in loading of said motor.

2. A control device as in claim 1, in which the measuring signal has a frequency proportional to the real speed of rotation of the motor, characterized in that the function generator is an adder which receives the value CN and adds to it a quantity representative of the period of the measuring signal.

3. A control device as in claim 2, characterized in that the function generator is a preloading counter of which the preloading input is connected to the output from the calculating means, the counting input is connected to the output from a clock and the counting control input receives counting control signals produced from the measuring signal.

4. A control device as in claim 3, characterized in that the contents of the counter is transferred into a store under the control of storage signals produced from the measuring signal.

5. A device for controlling the speed of a tape, comprising:
 (a) means for driving said tape, said means including a DC electric drive motor;
 (b) means for generating a first measuring signal representative of the real instantaneous speed of the tape;
 (c) means for generating a pilot signal representative of a reference speed, which may vary over time, at which the tape is to be driven by said drive means;
 (d) a control circuit for receiving said first measurement signal and said pilot signal, comprising:
  (i) means for comparing said first measurement signal and said pilot signal and for generating error information representative of the deviation between the real and reference speeds of the tape;
  (ii) means for generating reference information from the pilot signal related to the reference speed; and
  (iii) corrector means for modifying the reference information as a function of the error information, the rate of variation of the reference information having a maximum value limited in absolute value;
 (e) means for generating a second measuring signal representative of the real speed vm of the motor;
 (f) an operating circuit for receiving said second measuring signal and said modified reference information and for generating and supplying said motor with a DC drive signal having an operating value EN corresponding to the reference speed, comprising:
  (i) means for storing a digital representation of a prepositioning value CN;
  (ii) a function generator responsive to said second measuring signal and said prepositioning value CN for calculating said operating value EN as the sum of said prepositioning value CN and of a single-valued and monotonic function f of said real speed vm of the motor; and
  (iii) means, connected to the function generator for continuously calculating and modifying said prepositioning value CN as the difference between said operating value EN and the reference information; and
 (g) a circuit for receiving said operating value EN from the function generator and for driving the tape drive motor with a current directly proportional to said operating value EN, whereby said tape speed is continuously maintained at said reference speed despite variations in loading of said motor and said tape.

6. A control device as in claim 5, characterized in that the reference information is intermittently modified in case of need as a function of the error information by an amount which does not exceed in absolute value a predetermined maximum value.

7. A control device as in either claim 5 or 6, characterized in that the corrector means modify the reference information as a function solely of the sign of the error information.

8. A control device as in either claim 5 or 6, characterized in that the corrector means modify the reference information as a function of the sign and of the absolute value of the error information.

9. A control device as in claim 5, characterized in that the maximum value of the rate of variation of the reference information is determined so as to operate a recovery of the real speed of the tape at a speed which at a maximum is equal to about 1% of the reference speed.

10. A control device as in claim 5, characterized in that the reference information is modified in case of need as a function of the error information by a predetermined amount of fixed absolute value.

11. A control device as in claim 5, in which the first measuring signal has a frequency tied to the real speed of travel of the tape and the pilot signal has a frequency tied in the same way to the reference speed, characterized in that the comparison means deliver an error information which represents the variation with time of the phase shift between the measuring signal and the pilot signal.

12. A control device as in claim 5, in which the comparison means and the corrector means consist of a digital processing unit.

13. A device as in claim 5, in which the pilot signal is representative of the rate of travel of a second tape to which said driven tape is to be synchronized.

* * * * *